United States Patent
Vijay et al.

(10) Patent No.: US 11,472,539 B2
(45) Date of Patent: Oct. 18, 2022

(54) DISTRIBUTED LANDING GEAR SYSTEM ARCHITECTURE FOR ELECTROMECHANICAL ACTUATION

(71) Applicant: GOODRICH CORPORATION, Charlotte, NC (US)

(72) Inventors: Ashish Vijay, Bikaner (IN); Adnan Cepic, Mississauga (CA); Anil Prasad Josyula, Vijayawada (IN); Harish Gondihalli Venkatesha, Davanagere District (IN)

(73) Assignee: Goodrich Corporation, Charlotte, NC (US)

( * ) Notice: Subject to any disclaimer, the term of this patent is extended or adjusted under 35 U.S.C. 154(b) by 38 days.

(21) Appl. No.: 17/128,143

(22) Filed: Dec. 20, 2020

(65) Prior Publication Data

US 2021/0276698 A1    Sep. 9, 2021

(30) Foreign Application Priority Data

Mar. 5, 2020    (IN) .............................. 202041009543

(51) Int. Cl.
*B64C 25/26*   (2006.01)
*B64C 25/50*   (2006.01)
*B64C 25/24*   (2006.01)
*B64C 25/44*   (2006.01)

(52) U.S. Cl.
CPC .............. *B64C 25/24* (2013.01); *B64C 25/26* (2013.01); *B64C 25/44* (2013.01); *B64C 25/50* (2013.01)

(58) Field of Classification Search
CPC .............................. B64C 25/24; B64C 25/26
See application file for complete search history.

(56) References Cited

U.S. PATENT DOCUMENTS

| | | | |
|---|---|---|---|
| 7,226,018 B2 * | 6/2007 | Sullivan | B64C 25/42 244/111 |
| 7,786,615 B2 * | 8/2010 | Garcia | H02J 4/00 307/41 |
| 8,550,572 B2 * | 10/2013 | Summers | B60T 17/22 188/158 |
| 8,666,627 B2 | 3/2014 | May | |

(Continued)

FOREIGN PATENT DOCUMENTS

CN         114506444 A  *  5/2022

OTHER PUBLICATIONS

European Patent Office, European Partial Search Report dated Jul. 14, 2021 in Application No. 21160942.5.

(Continued)

*Primary Examiner* — Brian M O'Hara
(74) *Attorney, Agent, or Firm* — Snell & Wilmer L.L.P.

(57) ABSTRACT

A system for controlling landing gear subsystems may comprise a controller and a first motor drive unit in operable communication with the controller. A first electric motor and a second electric motor may be in operable communication with the first motor drive unit. A second motor drive unit may be in operable communication with the controller. A third electric motor and a fourth electric motor may be in operable communication with the second motor drive unit. An AC/DC converter may be electrically coupled to the first drive unit and the second motor drive unit.

15 Claims, 6 Drawing Sheets

(56) References Cited

U.S. PATENT DOCUMENTS

| | | | |
|---|---|---|---|
| 8,840,070 B2 * | 9/2014 | Boucaud | H02J 4/00 |
| | | | 307/9.1 |
| 9,656,641 B2 | 5/2017 | Griffith et al. | |
| 9,698,444 B2 | 7/2017 | Machida | |
| 9,783,173 B2 | 10/2017 | Giazotto | |
| 9,950,785 B2 | 4/2018 | Onfroy et al. | |
| 10,023,159 B2 * | 7/2018 | Sorin | B60T 1/10 |
| 10,023,303 B2 | 7/2018 | Moutaux et al. | |
| 2007/0284939 A1 * | 12/2007 | Charles | B60T 1/10 |
| | | | 303/152 |
| 2013/0082149 A1 | 4/2013 | Boucaud et al. | |
| 2014/0100719 A1 | 4/2014 | Thibault | |
| 2016/0070266 A1 | 3/2016 | Divito et al. | |
| 2017/0015408 A1 | 1/2017 | Rees et al. | |
| 2018/0370619 A1 | 12/2018 | Morioka et al. | |
| 2019/0263533 A1 | 8/2019 | Nierlich et al. | |
| 2019/0322359 A1 | 10/2019 | Arsenault | |
| 2021/0067001 A1 * | 3/2021 | Wissing | H02K 7/1846 |

OTHER PUBLICATIONS

European Patent Office, European Search Report dated Oct. 18, 2021 in Application No. 21160942.5.

* cited by examiner

DISTRIBUTED LANDING GEAR SYSTEM ARCHITECTURE FOR ELECTROMECHANICAL ACTUATION

CROSS-REFERENCE TO RELATED APPLICATIONS

This application claims priority to, and the benefit of, India Patent Application No. 202041009543, filed Mar. 5, 2020 and titled "DISTRIBUTED LANDING GEAR SYSTEM ARCHITECTURE FOR ELECTROMECHANICAL ACTUATION," which is incorporated by reference herein in its entirety for all purposes.

FIELD

The present disclosure relates to landing gear, and more particularly, to distributed landing gear system architectures for controlling actuation of landing gear subsystems.

BACKGROUND

Aircrafts generally include landing gear that supports the aircraft during taxi, take-off, and landing. After take-off, the landing gear may be translated to a "landing gear up" position, wherein the landing gear translates into a wheel well defined by, for example, a wing or a fuselage of the aircraft. Electrical landing gear systems may include electromechanical actuators (EMAs), or electric motors, configured to actuate various landing gear subsystems. Each EMA may have dedicated controller and motor drive unit configured to control and power the EMA. A controller and motor drive unit for each EMA tends to increase the size, weight, and number of parts associated with electrical landing gear systems.

SUMMARY

A system for controlling landing gear subsystems is disclosed herein. In accordance with various embodiments, the system may comprise a controller and a nose gear motor drive unit in operable communication with the controller. A first electric motor and a second electric motor may be in operable communication with the nose gear motor drive unit. The nose gear motor drive unit may be configured to drive one of the first electric motor or the second electric motor at a time. A main gear motor drive unit may be in operable communication with the controller. A third electric motor and a fourth electric motor may be in operable communication with the main gear motor drive unit. The main gear motor drive unit may be configured to drive one of the third electric motor or the fourth electric motor at a time.

In various embodiments, an alternating current direct current converter may be electrically coupled to the nose gear motor drive unit and the main gear motor drive unit. In various embodiments, a braking resistor may be electrically coupled to the nose gear motor drive unit and the main gear motor drive unit.

In various embodiments, a steering motor drive unit may be in operable communication with the controller. A fifth motor may be in operable communication with the steering motor drive unit. In various embodiments, the first electric motor may be configured to actuate a nose landing gear bay door, and the second electric motor may be configured to actuate a nose landing gear between a landing gear up position and a landing gear down position.

In various embodiments, the third electric motor may be configured to actuate a main landing gear bay door, and the fourth electric motor may be configured to actuate a main landing gear brake assembly.

In various embodiments, a first sensor may be operably coupled to at least one of the first electric motor or the second electric motor and in operable communication with the controller. A second sensor may be operably coupled to at least one of the third electric motor or the fourth electric motor and in operable communication with the controller. In various embodiments, the controller may be configured to output commands to the nose gear motor drive unit in response to signals output from the first sensor. The controller may be configured to output a second set of commands to the main gear motor drive unit in response to signals output from the second sensor.

A landing gear system is also disclosed herein. In accordance with various embodiments, the landing gear system may comprise a nose gear door motor and a nose gear motor drive unit in operable communication with the nose gear door motor. A nose gear retraction-extension motor may be in operable communication with the nose gear motor drive unit. An alternating current direct current converter may be electrically coupled to the nose gear motor drive unit. A controller may be in operable communication with the nose gear motor drive unit. A tangible, non-transitory memory may be configured to communicate with the controller. The tangible, non-transitory memory may have instructions stored thereon that, in response to execution by the controller, cause the controller to perform operations, which may comprise receiving, by the controller, a pilot command; determining, by the controller, a nose landing gear power sequence for providing powering to the nose gear door motor and the nose gear retraction-extension motor in response to receiving the pilot command; and outputting, by the controller, a first command to the nose gear motor drive unit. The nose gear motor drive unit may be configured to power either the nose gear door motor or the nose gear retraction-extension motor based on the first command from the controller.

In various embodiments, the nose gear motor drive unit may include a programmable logic device configured to receive commands, including the first command, from the controller. The programmable logic device may generate pulse width modulation signals configured to control at least one of the nose gear door motor or the nose gear retraction-extension motor based on the commands received from the controller.

In various embodiments, a first sensor may be operably coupled to the nose gear door motor and in communication with the controller. A second sensor may be operably coupled to the nose gear retraction-extension motor and in communication with the controller. In various embodiments, the operations may further comprise receiving, by the controller, a first signal from the first sensor; and determining, by the controller, whether to power the nose gear door motor or the nose gear retraction-extension motor based on the first signal.

In various embodiments, a main gear motor drive unit may be electrically coupled to the alternating current direct current converter and in operable communication with the controller. A main gear door motor may be in operable communication with the main gear motor drive unit. A brake control motor may be in operable communication with the main gear motor drive unit.

In various embodiments, the operations may further comprise determining, by the controller, a main landing gear power sequence for powering the main gear door motor and the brake control motor in response to receiving the pilot command; and outputting, by the controller, a second command to the main gear motor drive unit. The main gear motor drive unit may be configured to power either the main gear door motor or the brake control motor based on the second command from the controller.

A system for controlling landing gear subsystems, in accordance with various embodiments, may comprise a controller and a first motor drive unit in operable communication with the controller. A first electric motor and a second electric motor may be in operable communication with the first motor drive unit. A second motor drive unit may be in operable communication with the controller. A third electric motor and a fourth electric motor may be in operable communication with the second motor drive unit. An alternating current direct current converter may be electrically coupled to the first motor drive unit and the second motor drive unit.

In various embodiments, a braking resistor may be electrically coupled to the first motor drive unit and the second motor drive unit. In various embodiments, the first motor drive unit may include a first programmable logic device configured to receive a first command from the controller and generate first pulse width modulation signals configured to control at least one of the first electric motor or the second electric motor in response to the first command from the controller. The second motor drive unit may include a second programmable logic device configured to receive a second command from the controller and generate second pulse width modulation signals configured to control at least one of the third electric motor or the fourth electric motor in response to the second command from the controller.

In various embodiments, a first sensor may be operably coupled to the first electric motor and in communication with the controller. A second sensor may be operably coupled to the second electric motor and in communication with the controller. A third sensor may be operably coupled to the third electric motor and in communication with the controller. A fourth sensor may be operably coupled to the fourth electric motor and in communication with the controller.

In various embodiments, the first motor drive unit may be configured to drive the first electric motor non-simultaneously with the second electric motor. The second motor drive unit may be configured to drive the third electric motor non-simultaneously with the fourth electric motor at a time.

In various embodiments, the first electric motor may be configured to actuate a nose landing gear bay door, and the second electric motor may be configured to actuate a nose landing gear between a landing gear up position and a landing gear down position.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
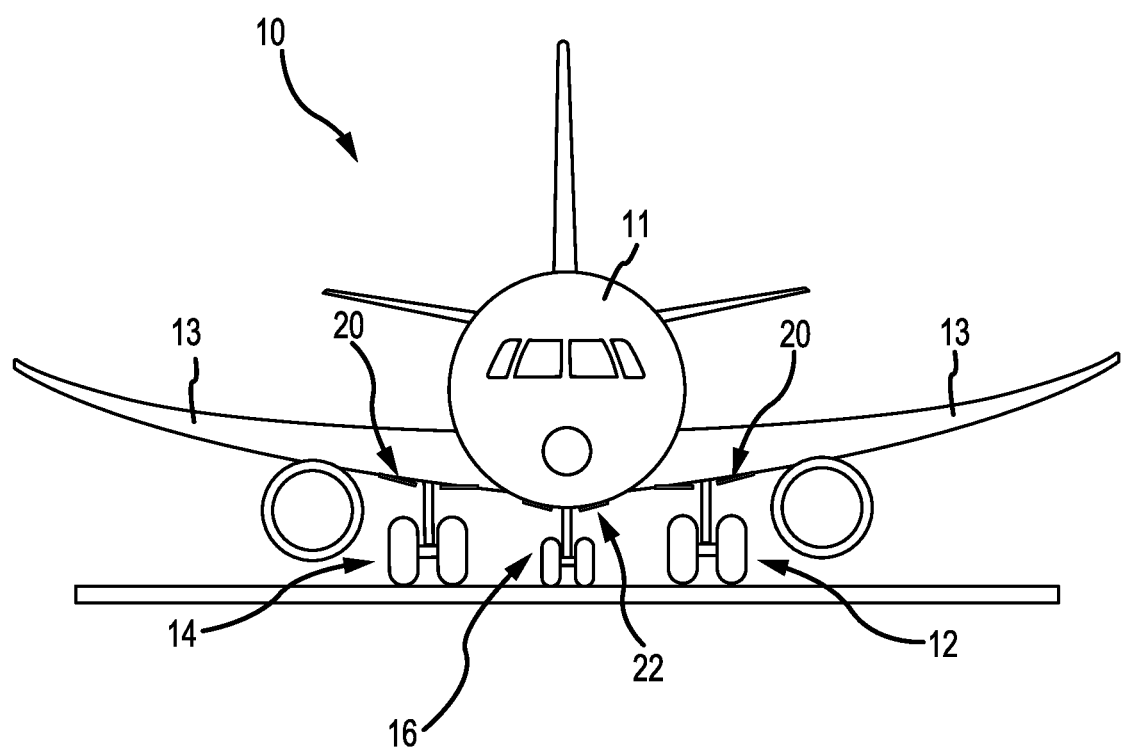
FIG. 1 illustrates an aircraft with landing gear in a landing gear down position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity.

Disclosed herein is a landing gear system architecture wherein resources are allocated and shared among various landing gear subsystems. In accordance with various embodiments, the system may include a common controller, AC/DC converter, and braking resistor operationally coupled to multiple motor drive units. In accordance with various embodiments, electric motors having non simultaneous operational times may be driven by a common (i.e., shared) motor drive unit. In this regard, the disclosed systems may reduce costs and weight as compared to systems having a motor drive unit for each motor and a controller, AC/DC converter, and braking resistor for each motor drive unit.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101

With reference to FIG. 1, an aircraft 10 is illustrated, in accordance with various embodiments. Aircraft 10 may include a fuselage 11 and wings 13. Aircraft 10 may further include landing gear such as left landing gear 12, right landing gear 14, and nose landing gear 16. Left landing gear 12, right landing gear 14, and nose landing gear 16 may generally support aircraft 10, when aircraft 10 is not flying, allowing aircraft 10 to taxi, take-off, and land without damage. Nose landing gear 16 is located under the nose of aircraft 10 and may not include a brake assembly. Nose landing gear 16 may be generally used for steering aircraft 10 during taxiing. Left landing gear 12 and right landing gear 14 may differ from nose landing gear 16, in that left landing gear 12 and right landing gear 14 each generally include a brake assembly.

Left landing gear 12, right landing gear 14, and nose landing gear 16 may each include various shock strut assemblies with one or more wheels attached thereto. Left landing gear 12, right landing gear 14, and nose landing gear 16 may each be configured to translate between a landing gear down position, wherein the landing gear extend from wings 13 and/or from fuselage 11 to support aircraft 10, and a landing gear up position, wherein the landing gear are located within wings 13 and/or fuselage 11 of aircraft 10. For example, during taxiing, take-off, and landing, left landing gear 12, right landing gear 14, and nose landing gear 16 may be in the landing gear down position. After take-off, left landing gear 12, right landing gear 14, and nose landing gear 16 may be translated to the landing gear up position. Prior to landing, left landing gear 12, right landing gear 14, and nose landing gear 16 may be translated to the landing gear down position to support aircraft 10 during landing. In various embodiments, aircraft 10 may comprise any number of landing gears and each landing gear may comprise any number of wheels.

In accordance with various embodiments, aircraft 10 may include main landing gear bay doors 20 and nose landing gear bay doors 22, which may be translated between an open position prior to landing gear retraction to a closed position after landing gear retraction. Bay doors 20, 22 are also translated to the open position prior to landing gear extension.

Figure 2:
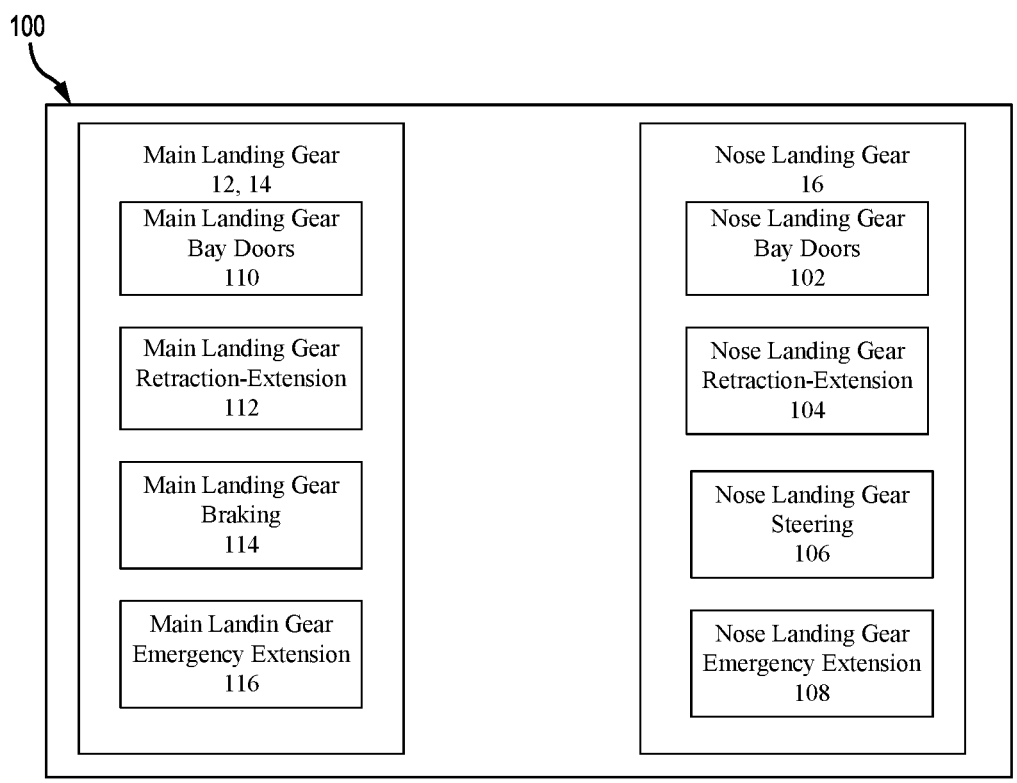
FIG. 2 illustrates a schematic of aircraft landing gear system, in accordance with various embodiments.

With reference to FIGS. 1 and 2, aircraft 10 may include a landing gear system 100 configured to control operation of left landing gear 12 and right landing gear 14 (collectively referred to as "main landing gear") and operation of nose landing gear 16. In accordance with various embodiments, landing gear system 100 comprises various subsystems configured to control different aspects of landing gear operation. For example, landing gear system 100 includes a nose landing gear bay door actuation subsystem 102 for controlling the opening and closing of nose landing gear bay doors 22, a nose landing gear retraction-extension subsystem 104 for controlling retraction and extension of nose landing gear 16, a nose landing gear steering subsystem 106 for controlling steering of nose landing gear 16, and a nose landing gear emergency extension subsystem 108 for extending nose landing gear 16 should the nose landing gear retraction-extension subsystem 104 fail. Landing gear system 100 may further include a main gear bay door actuation subsystem 110 for controlling the opening and closing of main landing gear bay doors 20, a main landing gear retraction-extension subsystem 112 for controlling retraction and extension of main landing gear 12, 14, a main landing gear brake control subsystem 114 for controlling the brake assemblies of main landing gear 12, 14, and a main landing gear emergency extension subsystem 116 for extending main landing gear 12, 14 should the main landing gear retraction-extension subsystem 112 fail.

In accordance with various embodiments, the subsystems of landing gear system 100 generally do not operate simultaneously. TABLE 1 shows a typical operational scenario of aircraft 10, where T1, T2, and T3 are the time durations for operation of landing gear subsystems 102, 104, 106, 110, 112, 114, and Power Demand is the relative power (e.g., high or low) associated with operation of the respective subsystem.

TABLE 1

| Landing Gear Subsystem | T1 | T2 | T3 | Power Demand |
|---|---|---|---|---|
| Nose Landing Gear Bay Door Actuation 102 | X | | | Low |
| Nose Landing Gear Retraction-Extension 104 | | X | | Low |
| Nose Landing Gear Steering 106 | | | X | Low |
| Main Landing Gear Bay Door Actuation 110 | X | | | Low |
| Main Landing Gear Retraction-Extension 112 | | X | | High |
| Main Landing Gear Brake Control 114 | | | X | Low |

As illustrated in TABLE 1, nose landing gear door actuation, nose landing gear retraction-extension, and nose landing gear steering control do not have overlapping operation time. Similarly, main landing gear door actuation, main landing gear retraction-extension, and main landing gear brake control have non-simultaneous (i.e., nonconcurrent) operation. Thus, it may be desirable to design a system architecture for landing gear system 100, wherein resources are shared among the subsystems, thereby reducing system costs and weight. In various embodiments, the landing gear subsystems 102, 104, 106, 110, and 114, which have a relatively low power demand, may be powered electrically and main landing gear retraction-extension subsystem 112, which has a relatively high power demand, may be powered hydraulically. Thus, in various embodiments, landing gear system 100 may be a hybrid system that employs electromechanical actuators, or electric motors, for actuation of landing gear subsystems 102, 104, 106, 110, and 114, and hydraulic actuators for actuation of main landing gear retraction-extension subsystem 112. In various embodiments, landing gear system 100 may employ electromechanical actuators, or electric motors, for actuation of landing gear subsystems 102, 104, 106, 110, and 114, and for actuation of main landing gear retraction-extension subsystem 112.

Figure 3:
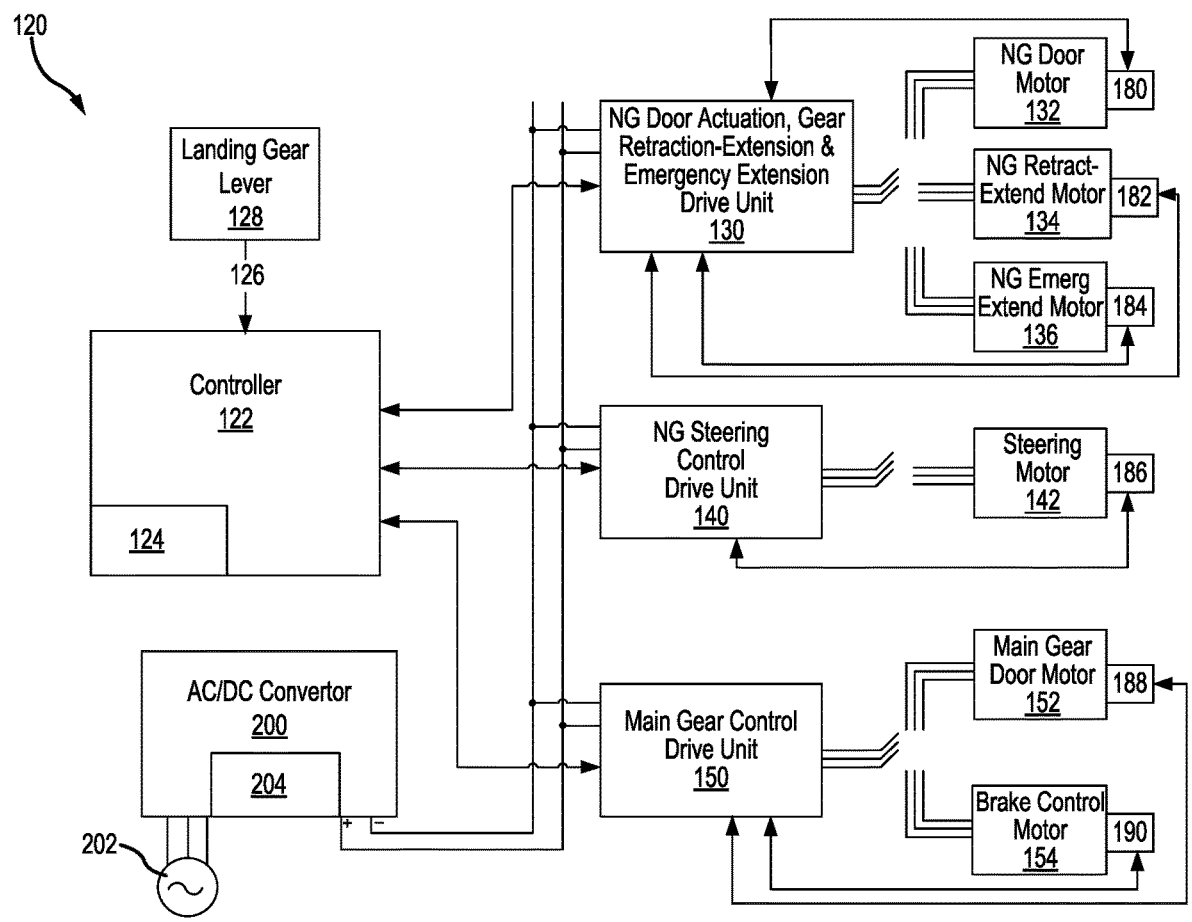
FIG. 3 illustrates a schematic of a system for controlling landing gear subsystems, in accordance with various embodiments.

With reference to FIG. 3, and continuing reference to FIGS. 1 and 2, a system 120 for powering and controlling various landing gear subsystems is illustrated. System 120 may include a nose gear door actuation, gear retraction-extension, and emergency extension motor drive unit 130 (referred to herein as nose gear motor drive unit 130) configured to drive a nose gear door motor 132, a nose gear retraction-extension motor 134, and an emergency nose gear extension motor 136. In various embodiments, nose gear door motor 132, nose gear retraction-extension motor 134, and emergency nose gear extension motor 136 may each comprises an electric motor (e.g., a permanent magnet synchronous motor (PMSM), a brushless direct current (BLDC) motor, or other suitable electric motor). Nose gear door motor 132 may translate nose landing gear bay doors 22 between the open and closed position. Nose gear retraction-extension motor 134 may translate nose landing gear 16 between the landing gear down and landing gear up positions. Emergency nose gear extension motor 136 may translate nose landing gear 16 to the landing gear down position.

During operation of aircraft 10, nose gear door motor 132, nose gear retraction-extension motor 134, and emergency nose gear extension motor 136 may be operated at different times (i.e., not simultaneously). In accordance with various embodiments, a single nose gear motor drive unit 130 may be employed to operate (i.e., drive) nose gear door motor 132, nose gear retraction-extension motor 134, and emergency nose gear extension motor 136. For example, if nose gear motor drive unit 130 is driving nose gear door motor 132, nose gear retraction-extension motor 134, and emergency nose gear extension motor 136 may be dormant (i.e., powered off).

System 120 may further include a steering motor drive unit 140 configured to drive steering control motor 142. In various embodiments, steering control motor 142 comprises an electric motor (e.g., a PMSM, a BLDC motor, or other suitable electric motor). Steering control motor 142 may control the steering system used to steer nose landing gear 16 (e.g., steering control motor 142 may pivot, or turn, nose landing gear 16 to the left or to the right). During operation of aircraft 10, steering control motor 142 may be operated at a different time from (i.e., non-simultaneously or nonconcurrent with) nose gear door motor 132, nose gear retraction-extension motor 134, and emergency nose gear extension motor 136.

System 120 may further include a main landing gear door actuation and brake control motor drive unit 150 (referred to herein as main gear motor drive unit 150) configured to drive one or more main gear door motor(s) 152 and one or more brake control motor(s) 154. In various embodiments, main gear door motors 152 and brake control motors 154 comprise electric motors (e.g. PMSMs, BLDC motors, or other suitable electric motor). Main gear door motors 152 translate main landing gear bay doors 20 between the open and closed positions. Brake control motors 154 control the braking of main landing gear 12, 14. For example, brake control motors 154 may control the braking pressure applied by the brake assemblies of main landing gear 12, 14.

During operation of aircraft 10, main gear door motors 152 and brake control motors 154 may be operated at different times (i.e., non-simultaneously or nonconcurrent with one another). In accordance with various embodiments, a single main gear motor drive unit 150 may be employed to operate (i.e., drive) main gear door motors 152 and brake control motors 154. For example, if main gear motor drive unit 150 is driving the main gear door motors 152, the brake control motors 154 may be dormant (i.e., powered off).

System 120 further includes a controller 122. Controller 122 is operably coupled to and in communication with nose gear motor drive unit 130, steering motor drive unit 140, and main gear motor drive unit 150. Controller 122 may include operating instructions and/or power sequence logic configured to cause nose gear motor drive unit 130, steering motor drive unit 140, and/or main gear motor drive unit 150 to power motors 132, 134, 136, 142, 152, and 154 in a particular order and/or during certain operating conditions.

Controller 122 may include and communicate with one or more processors and one or more tangible, non-transitory storage medium(s), or memories, 124 and is capable of implementing landing gear logic. The processor can be a general purpose processor, a digital signal processor (DSP), an application specific integrated circuit (ASIC), a field programmable gate array (FPGA) or other programmable logic device (PLD), discrete gate or transistor logic, discrete hardware components, or a combination thereof. System program instructions and/or processor instructions may be loaded onto tangible, non-transitory computer-readable storage medium 124. The system program instructions and/or processor instructions may, in response to execution by controller 122, cause controller 122 to perform various operations. In particular, and as described in further detail below, the instructions may allow controller 122 to make operating and/or power sequence decisions relative the landing gear subsystems. For example, controller 122 may be configured to determine which of motors 132, 134, 136, 142, 152, 154 should be receiving power and/or operating at a particular time.

In various embodiments, system 120 may include one or more door sensors 180 operationally coupled to nose gear door motor 132 and/or to nose landing gear bay doors 22. The output of door sensors 180 may correlate to operating conditions of nose gear door motor 132 (e.g., velocity, position, etc.). The output of door sensors 180 may also provide information related to the position of nose landing gear bay doors 22. The output of door sensors 180 may be received by nose gear motor drive unit 130. The output of door sensors 180 may be sent from nose gear motor drive unit 130 to controller 122. Controller 122 may make decisions related to the operation of nose gear door motor 132 based on the signals output from door sensors 180. Controller 122 may also make decisions related to the operation of nose gear retraction-extension motor 134, emergency nose gear extension motor 136 and/or steering control motor 142 based on the signals output from door sensors 180. In various embodiments, controller 122 may output commands to nose gear motor drive unit 130 configured to cause nose gear motor drive unit 130 to power (or excite) door sensors 180, when nose gear door motor 132 is in operation. In various embodiments, door sensors 180 may also operate (i.e., receive power and provide output) when nose gear door motor 132 is turned off.

System 120 may include one or more retraction sensors 182 operationally coupled to nose gear retraction-extension motor 134 and/or to components of nose landing gear 16 (e.g., to a shock strut of nose landing gear 16). The output of retraction sensors 182 may correlate to one or more operating conditions of nose gear retraction-extension motor 134 (e.g., velocity, position, etc.). The output of retraction sensors 182 may also provide information related to the position of nose landing gear 16 (e.g., extended, retracted, etc.). The output of retraction sensors 182 may be received by nose gear motor drive unit 130. The output of retraction sensors 182 may be sent from nose gear motor drive unit 130 to controller 122. Controller 122 may make decisions related to the operation of nose gear retraction-extension motor 134 based on the signals output from retraction sensors 182. Controller 122 may also make decisions related to the operation of nose gear door motor 132, emergency nose gear extension motor 136 and/or steering control motor 142 based on the signals output from retraction sensors 182. In various embodiments, controller 122 may output commands to nose gear motor drive unit 130 configured to cause nose gear motor drive unit 130 to power (or excite) retraction sensors 182, when nose gear retraction-extension motor 134 is in operation. In various embodiments, retraction sensors 182 may also operate (i.e., receive power and provide output) when nose gear retraction-extension motor 134 is turned off.

System 120 may include one or more emergency extension sensors 184 operationally coupled to emergency nose gear extension motor 136 and/or to components of nose landing gear 16 (e.g., to a shock struct of nose landing gear 16). The output of emergency extension sensors 184 may correlate to operating conditions of emergency nose gear extension motor 136 (e.g., velocity, position, etc.). The output of emergency extension sensors 184 may also provide information related to the position of nose landing gear 16 (e.g., extended, retracted, etc.). The output of emergency extension sensors 184 may be received by nose gear motor drive unit 130. The output of emergency extension sensors 184 may be sent from nose gear motor drive unit 130 to controller 122. Controller 122 may make decisions related to the operation of emergency nose gear extension motor 136 based on the signals output from emergency extension sensors 184. Controller 122 may also make decision related to the operation of nose gear door motor 132, nose gear retraction-extension motor 134, and/or steering control motor 142 based on the signals output from emergency extension sensors 184. In various embodiments, controller 122 may output commands to nose gear motor drive unit 130 configured to cause nose gear motor drive unit 130 to power (or excite) emergency extension sensors 184, when emergency nose gear extension motor 136 is in operation. In various embodiments, emergency extension sensors 184 may also operate (i.e., receive power and provide output) when emergency nose gear extension motor 136 is turned off.

System 120 may include one or more steering sensors 186 operationally coupled to steering control motor 142 and/or to components of nose landing gear 16. The output from steering sensors 186 may correlate to one or more operating conditions of steering control motor 142 (e.g., velocity, position, etc.). The output of steering sensors 186 may also provide information related to the positioning or orientation (left, right, etc.) of nose landing gear 16. The output of steering sensors 186 may be received by steering motor drive unit 140. The output from steering sensors 186 may be sent from steering motor drive unit 140 to controller 122. Controller 122 may make decisions related to the operation of steering control motor 142 based on the signals output from steering sensors 186. Controller 122 may also make decisions related to the operation of nose gear door motor 132, nose gear retraction-extension motor 134, and/or emergency nose gear extension motor 136 based on the signals output from steering sensors 186. In various embodiments, controller 122 may output commands to steering motor drive unit 140 configured to cause steering motor drive unit 140 to power (or excite) steering sensors 186, when steering control motor 142 is in operation. In various embodiments, steering sensors 186 may also operate (i.e., receive power and provide output), when steering control motor 142 is turned off.

System 120 may include one or more main door sensors 188 operationally coupled to main gear door motors 152 and/or to main landing gear bay doors 20. The output of main door sensors 188 may correlate to one or more operating conditions of main gear door motors 152 (e.g., velocity, position, etc.). The output of main door sensors 188 may also provide information related to the position of main landing gear bay doors 20. The output of main door sensors 188 may be received by main gear motor drive unit 150. The output of main door sensors 188 may be sent from main gear motor drive unit 150 to controller 122. Controller 122 may make decisions related to the operation of main gear door motors 152 based on the signals output from main door sensors 188. In various embodiment, controller 122 may also make decisions related to the operation of brake control motors 154 based on the output from main door sensors 188. In various embodiments, controller 122 may output commands to main gear motor drive unit 150 configured to cause main gear motor drive unit 150 to power (or excite) main door sensors 188, when main gear door motors 152 is in operation. In various embodiments, main door sensors 188 may also operate (i.e., receive power and provide output), when main gear door motors 152 are turned off.

System 120 may include one or more brake sensors 190 operationally coupled to the brake control motors 154 and/or to the braking assemblies or other components of the main landing gear 12, 14. The brake sensors 190 may include sensor that output data correlating to one or more operating conditions of the brake control motors 154 (e.g., velocity, position, etc.). Brake sensors 190 may also include sensor configured to out information related to the position or pressure being applied by the brake assemblies of the main landing gear 12, 14. Brake sensors 190 may also include sensors that provide information related to whether aircraft 10 is on the ground or in the air (e.g., brake sensors 190 may include one or more weight on wheels sensors). In various embodiments, the brake assemblies of main landing gear 12, 14 may be configured to not apply braking pressure when the aircraft is in the air (e.g., brake command signals from the pilot or from an autobraking system may be disabled when the aircraft is in the air). In this regard, the brake assemblies may be configured to apply braking pressure when, based on the output from one or more brake sensors 190, aircraft 10 is determined to be on the ground. In various embodiments, the output of brake sensors 190 may be received by main gear motor drive unit 150. The output of brake sensors 190 may be sent from main gear motor drive unit 150 to controller 122. Controller 122 may make decisions related to the operation of brake control motors 154 based on the signals output from brake sensors 190. Controller 122 may also make decisions related to the operation of main gear door motors 152 based on the signals output from brake sensors 190. In various embodiments, controller 122 may output commands to main gear motor drive unit 150 configured to cause main gear motor drive unit 150 to power (or excite) brake sensors 190, when brake control motors 154 are in operation. In various embodiments, brake sensors 190 may also operate (i.e., receive power and provide output), when brake control motors 154 are turned off.

In accordance with various embodiments, controller 122 is configured to make operating decisions for controlling the various landing gear subsystems and motors 132, 134, 136, 142, 152, 154. Controller 122 may determine the sequence in which motors 132, 134, 136, 142, 152, 154 are powered in response to receiving pilot commands 126 from the cockpit (e.g., from the pilot, the co-pilot, or higher level flight control systems) of aircraft 10. Stated differently, controller 122 may determine a nose gear power sequence for powering motors 132, 134, 136, and 142 and a main landing gear power sequence for powering main gear door motors 152 and brake control motors 154 in response to receiving pilot command 126. In various embodiments, controller 122 may receive pilot command 126 in response to, for example, the pilot translating a landing gear lever 128 between a landing up lever position and a landing gear down lever position. Controller 122 may determine a sequence of operation for motors 132, 134, 136, 142, 152, 154 in response to pilot command 126. Stated differently, controller 122 may output a series of power commands to nose gear motor drive unit 130, steering motor drive unit 140, and/or main gear motor drive unit 150, in response to the landing gear lever 128 being translated from the landing up lever position to the landing down lever position or from the landing gear down lever position to the landing gear up lever position.

For example, with combined reference to FIGS. 1 and 3, in response to receiving a pilot command 126 indicating landing gear lever 128 was translated from the landing gear up lever position to the landing gear down lever position, controller 122 may determine a nose gear power sequence configured to first open the nose landing gear bay doors 22, then extend the nose landing gear 16, and then power the steering motor. In this regard, controller 122 may be configured to, in response to receiving pilot command 126, output a command (or series of commands) to nose gear motor drive unit 130. The command may be configured to cause nose gear motor drive unit 130 to power nose gear door motor 132, thereby causing nose landing gear bay doors 22 to open. In response to controller 122 determining the nose landing gear bay doors 22 are open (e.g., in response signals received from door sensors 180), controller 122 may send a command (or series of commands) to nose gear motor drive unit 130 configured to cause nose gear motor drive unit 130 to stop powering (i.e., power-off) nose gear door motor 132 and to start powering (i.e., power-on) nose gear retraction-extension motor 134, thereby causing nose landing gear 16 to extend. If controller 122 determines nose landing gear 16 has not extended, for example, based on output from retraction sensors 182, controller 122 may send a command (or series of commands) configured to cause nose gear motor drive unit 130 to stop powering (i.e., power-off) nose gear retraction-extension motor 134 and to start powering (i.e., power-on), emergency nose gear extension motor 136, thereby causing nose landing gear 16 to extend. In response to controller 122 determining nose landing gear 16 is the landing gear down position (e.g., in response to signals from retraction sensors 182 and/or emergency extension sensors 184), controller 122 may send a command (or series of commands) to steering motor drive unit 140 and a command (or series of commands) to nose gear motor drive unit 130. The commands may be configured to cause nose gear motor drive unit 130 to stop powering (i.e., power-off) nose gear retraction-extension motor 134 and to start powering (i.e., power-on) steering control motor 142.

In accordance with various embodiments, in response to receiving the pilot command 126 indicating landing gear lever 128 was translated from the landing gear up lever position to the landing gear down lever position, controller 122 may also determine a main landing gear power sequence configured to first power the main gear door motors 152 and then power the brake control motors 154. In this regard, controller 122 may be configured to, in response to receiving pilot command 126, output a first command (or series of first commands) to main gear motor drive unit 150 configured to cause main gear motor drive unit 150 to power the main gear door motors 152, thereby causing main landing gear bay doors 20 to open. In response to controller 122 determining the nose landing gear bay doors 22 are open (e.g., in response signals received from main door sensors 188), controller 122 may send a command (or series of second commands) to main gear motor drive unit 150 configured to cause main gear motor drive unit 150 to stop powering (i.e., power-off) main gear door motors 152 and to start powering (i.e., power-on) brake control motors 154.

With continued referent to FIG. 3, in accordance with various embodiments, system 120 includes an alternating current to direct current (AC/DC) converter 200. AC/DC converter 200 is configured to provide power (e.g., DC current) to each of nose gear motor drive unit 130, steering motor drive unit 140, and main gear motor drive unit 150. In this regard, AC/DC converter 200 is electrically coupled to an AC power supply 202 and to nose gear motor drive unit 130, steering motor drive unit 140, and main gear motor drive unit 150. AC/DC converter 200 is configured convert the AC received from AC power supply 202 to DC, which is provided to nose gear motor drive unit 130, steering motor drive unit 140, and/or main gear motor drive unit 150.

The power provided by AC/DC converter 200 is configured to power nose gear door motor 132, nose gear retraction-extension motor 134, emergency nose gear extension motor 136, steering control motor 142, main gear door motors 152, and/or brake control motors 154. Power may be provided by a common, or single, AC/DC converter 200 as drive nose gear door motor 132, nose gear retraction-extension motor 134, and emergency nose gear extension motor 136 do not operate simultaneously and because main gear door motors 152 do not operate simultaneously with brake control motors 154. In this regard, at a given time, the current provided by AC/DC converter 200 may be supplied to either nose gear door motor 132, nose gear retraction-extension motor 134, or emergency nose gear extension motor 136; to steering control motor 142; and to either main gear door motors 152 or brake control motors 154.

In response to receiving pilot command 126 (e.g., a landing gear lever up or landing gear lever down signal), controller 122 may determine the sequence in which power from AC/DC converter 200 is provided to nose gear door motor 132, nose gear retraction-extension motor 134, emergency nose gear extension motor 136, and steering control motor 142 and the sequence in which power from AC/DC converter 200 is provided to main gear door motors 152 and brake control motors 154. In this regard, controller 122 determines and controls which nose landing gear motors (e.g., nose gear door motor 132, nose gear retraction-extension motor 134, emergency nose gear extension motor 136, or steering control motor 142) and which main landing gear motors (e.g., main gear door motors 152 or brake control motors 154) should be powered-on and which should be powered-off. Controller 122 may send commands to nose gear motor drive unit 130, steering motor drive unit 140, and main gear motor drive unit 150 based on the determined sequence. The commands are configured to cause to nose gear motor drive unit 130, steering motor drive unit 140, main gear motor drive unit 150 to power the motor(s) in the sequence determined by controller 122.

System 120 employs a centralized AC/DC converter 200, rather than individual AC/DC converter for each drive unit.

The power provided by AC/DC converter 200 may be less than the sum of the peak of the power associated with driving each of motors 132, 134, 136, 142, 152, 154, as motors 132, 134, and 136, for example, do not operate simultaneously. In this regard, centralized AC/DC converter 200 may decrease the cost and weight of system 120, as compared to systems wherein each motor has a dedicated motor drive unit, and each motor drive unit has a dedicated AC/DC converter. In various embodiments, each of motor drive units 130, 140, 150 may include a DC link capacitor, rather than a complete AC/DC converter, which tends to reduce the size and weight of the motor drive units.

In accordance with various embodiments, system 120 may also include a braking resistor 204 electrically coupled to nose gear motor drive unit 130, steering motor drive unit 140, and main gear motor drive unit 150. Braking resistor 204 is configured to dissipate the regeneration energy of the motor drive units 130, 140, 150. System 120 employing a centralized braking resistor circuit to dissipate the regeneration energy from any of motor drive units 130, 140, 150, tends to decrease a weight and size of motor drive units 130, 140, 150, as compared to motor drive units that include their own dedicated braking resistor within the motor drive unit. In various embodiments, system 120 including braking resistor 204 may allow liquid cooling to be employed to dissipate heat from braking resistor 204, as single, centralized a braking resistor circuit simplifies the routing of the liquid coolant, as compared to systems wherein liquid cooling is provided to individual brake resistor units located in each motor drive unit.

Figure 4:
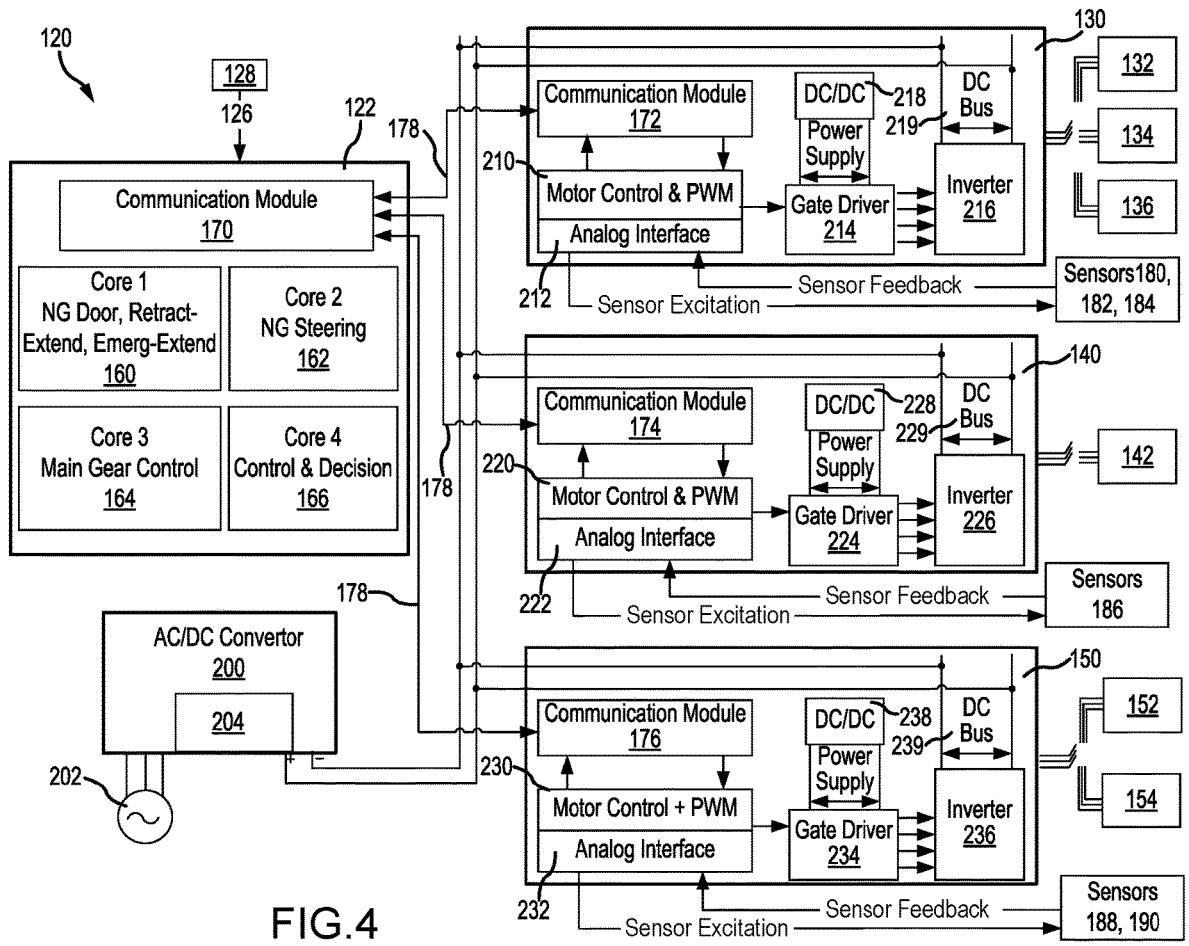
FIG. 4 illustrates a schematic of a system for controlling landing gear subsystems, in accordance with various embodiments.

With reference to FIG. 4, addition details of controller 122 and nose gear motor drive unit 130, steering motor drive unit 140, and main gear motor drive unit 150 are illustrated. In various embodiments, controller 122 may be a multi-core controller. Controller 122 may have a core dedicated each of the motor drive units 130, 140, 150. In various embodiments, controller 122 may include a first core 160 having instructions stored thereon related to operation of nose gear motor drive unit 130. Controller 122 may include a second core 162 having instructions stored thereon related to operation of steering motor drive unit 140. Controller 122 may include a third core 164 having instruction related to operation of main gear motor drive unit 150. Controller 122 may further include a fourth core 166 having instruction stored thereon related to management of the other cores of controller 122. Fourth core 166 may be in communication with first core 160, second core 162, and third core 164. Cores 160, 162, 164, 166 may each include one or more processors and one or more tangible, non-transitory storage medium(s). The processor can be a general purpose processor, a DSP, an ASIC, a FPGA or other programmable logic device, discrete gate or transistor logic, discrete hardware components, or a combination thereof.

First core 160, second core 162, and third core 164 are in communication with nose gear motor drive unit 130, steering motor drive unit 140, and main gear motor drive unit 150, respectively. First core 160, second core 162, and third core 164 may send commands to nose gear motor drive unit 130, steering motor drive unit 140, and main gear motor drive unit 150, respectively, via a communication module 170 of controller 122. In various embodiments, nose gear motor drive unit 130 includes a communication module 172, steering motor drive unit 140 includes a communication module 174, and main gear motor drive unit 150 includes a communication module 176. Communication modules 172, 174, 176 are each operably coupled to communication module 170 of controller 122 via links 178. Links 178 may represent a wired or a wireless connection. In this regard, communication modules 172, 174, 176 may communicated with communication module 170 wireless or in various embodiments, via wired connection. In various embodiments, a digital cable may electrically couple communication modules 172, 174, 176 to communication module 170.

Controller 122 may receive information related to operation of nose gear motor drive unit 130, steering motor drive unit 140, and main gear motor drive unit 150 via communication module 170 and communication modules 172, 174, 176. The information received by controller 122 may be related to operation of nose gear door motor 132, nose gear retraction-extension motor 134, emergency nose gear extension motor 136, steering control motor 142, main gear door motors 152, and brake control motors 154.

With continued reference to FIG. 4, additional details of motor drive units 130, 140, 150 are illustrated. In various embodiments, nose gear motor drive unit 130 may include communication module 172, which is configured to communicate with controller 122. Nose gear motor drive unit 130 may include a device 210 configured to control nose gear door motor 132, nose gear retraction-extension motor 134, and/or emergency nose gear extension motor 136. Device 210 may be a FPGA or other PLD. Device 210 may be configured to receive commands from controller 122 and generate pulse width modulation (PWM) signals corresponding to the commands from controller 122. The PWM signals may be provided to and may control nose gear door motor 132, nose gear retraction-extension motor 134, and/or emergency nose gear extension motor 136. Device 210 may include an analog interface 212 for receiving and outputting signals to sensors 180, 182, 184. Nose gear motor drive unit 130 further includes a gate drive circuit 214 configured to receive output from device 210 and, in response to the signals from device 210, output to signals to an inverter 216 of nose gear motor drive unit 130. In various embodiments, inverter 216 may be a three phase inverter. In various embodiments, nose gear motor drive unit 130 may include a DC/DC converter 218 for powering the components of the nose gear motor drive unit 130 (e.g., gate drive circuit 214, communication module 172, etc.). In various embodiments, nose gear motor drive unit 130 may include a DC BUS 219 operationally coupled to inverter 216.

In various embodiments, steering motor drive unit 140 may include communication module 174, which is configured to communicate with controller 122. Steering motor drive unit 140 may include a device 220 configured to control the steering control motor 142. Device 220 may be FPGA or other PLD. Device 220 may be configured to receive commands from controller 122 and generate PWM signals corresponding to the commands from controller 122. The PWM signal may be provided to and may control the steering control motor 142. Device 220 may include an analog interface 222 for receiving signals from and outputting signals to steering sensors 186. Steering motor drive unit 140 further includes a gate drive circuit 224 configured to receive output from device 220 and, in response to the signals from device 220, output to signals to an inverter 226 of steering motor drive unit 140. In various embodiments, inverter 226 may be a three phase inverter. In various embodiments, steering motor drive unit 140 may include a DC/DC converter 228 for powering the components of the steering motor drive unit 140 (e.g., gate drive circuit 224, communication module 174, etc.). In various embodiments, steering motor drive unit 140 may include a DC BUS 229 operationally coupled to inverter 226.

In various embodiments, main gear motor drive unit 150 may include communication module 176, which is configured to communicate with controller 122. Main gear motor drive unit 150 may include a device 230 configured to control the main gear door motors 152 and brake control motors 154. Device 230 may be FPGA or other PLD. Device 230 may be configured to receive commands from controller 122 and generate PWM signals corresponding to the commands from controller 122. The PWM signal may be provided to and may control the main gear door motors 152 and brake control motors 154. Device 230 may include an analog interface 232 for receiving and outputting signals to sensors 188, 190. Main gear motor drive unit 150 further includes a gate drive circuit 234 configured to receive output from device 230 and, in response to the signals from device 230, output to signals to an inverter 236 of main gear motor drive unit 150. In various embodiments, inverter 236 may be a three phase inverter. In various embodiments, main gear motor drive unit 150 may include a DC/DC converter 238 for powering the components of the main gear motor drive unit 150 (e.g., gate drive circuit 234, communication module 176, etc.). In various embodiments, main gear motor drive unit 150 may include a DC BUS 239 operationally coupled to inverter 236.

System 120 including AC/DC converter 200 is configured to generate high voltage direct current (HVDC) rail for use by each of motor drive units 130, 140, 150. This may allow for the elimination of dedicated rectifier units in each of the motor drive units. The power level of AC/DC converter 200 may be optimized to meet the power demands of each of motor drive units 130, 140, 150. Using AC/DC converter 200 to power each of motor drive units 130, 140, 150 decreases the cost, weight, and space occupied by the system. Cooling a centralized braking resistor 204, as opposed to individual braking resistors in each of motor drive units 130, 140, 150, allows the size of the motor drive units to be reduced, as individual heat sink may be eliminated from the motor drive unit. System 120 employing a single, common controller 122 for controlling multiple drive units and motors tends to reduce the component count, cost, weight and space occupied by system 120.

Figure 5:
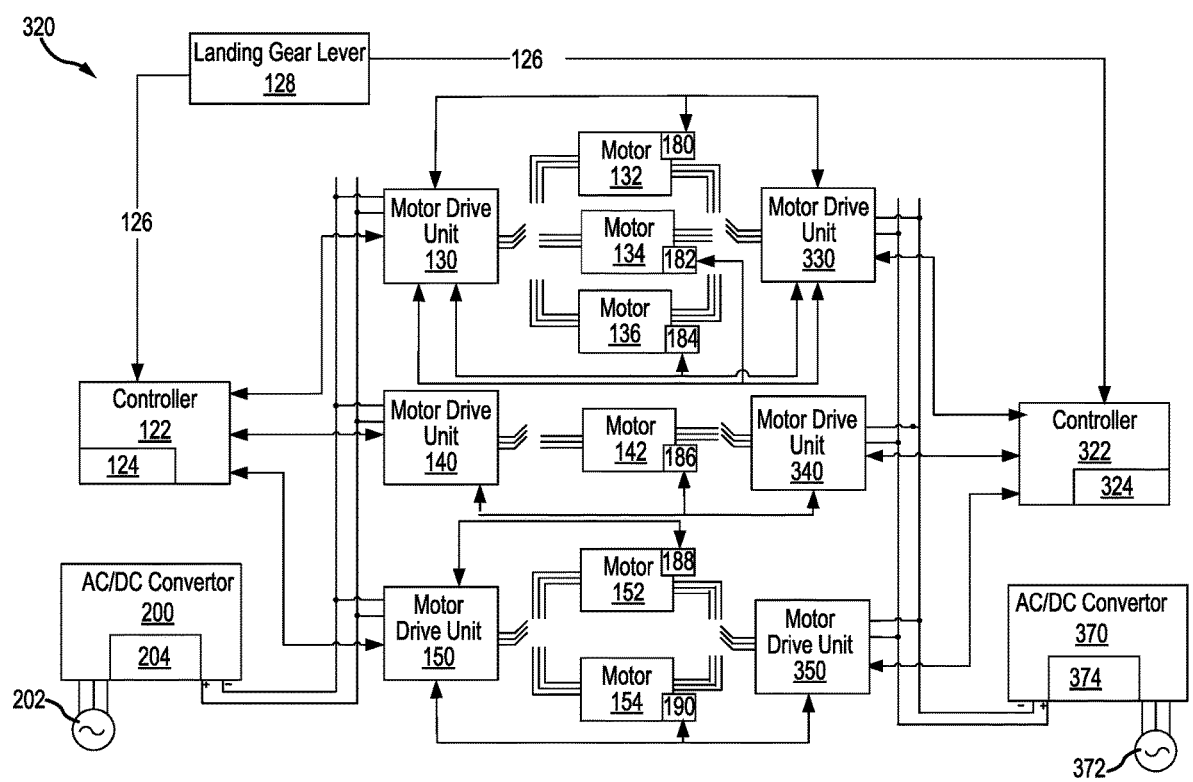
FIG. 5 illustrates a schematic of a system for controlling landing gear subsystems and including various redundancies, in accordance with various embodiments.

With reference to FIG. 5, a system 320 for controlling landing gear subsystems is illustrated. System 320 is similar to system 120 in FIGS. 3 and 4, but includes various redundancies. Elements with like element numbering, as depicted in FIG. 3, are intended to be the same and will not necessarily be repeated for the sake of clarity.

In accordance with various embodiments, system 320 includes controller 122, motor drive units 130, 140, 150, and motors 132, 134, 136, 142, 152, 154, as described with reference to system 120 in FIGS. 3 and 4. System 320 further includes AC/DC converter 200, AC power supply 202, and braking resistor 204. In accordance with various embodiments, system 320 may further include a secondary controller 322, similar to controller 122, and having one or more processors and one or more tangible, non-transitory storage medium(s), or memories, 324. In various embodiments, secondary controller 322 may be in communication with and/or may provide commands to motor drive units 130, 140, 150. Secondary controller 322 may be identical, or nearly identical, to controller 122, and may provide redundancy should controller 122 fail.

In accordance with various embodiments, system 320 may further include a secondary nose gear door actuation, gear retraction-extension, and emergency extension motor drive unit 330 (referred to herein as secondary nose gear motor drive unit 330). Secondary nose gear motor drive unit 330 is operationally coupled to secondary controller 322. Secondary nose gear motor drive unit 330 is configured to drive nose gear door motor 132, nose gear retraction-extension motor 134, and emergency nose gear extension motor 136 in response to commands from secondary controller 322. In various embodiments, secondary nose gear motor drive unit 330 may be in communication with and/or receive commands from both controller 122 and secondary controller 322. Secondary nose gear motor drive unit 330 may be identical, or nearly identical, to nose gear motor drive unit 130 and may provide redundancy should nose gear motor drive unit 130 fail.

System 320 may further include a secondary steering motor drive unit 340 operationally coupled to secondary controller 322. Secondary steering motor drive unit 340 is configured to drive steering control motor 142 in response to commands from secondary controller 322. In various embodiments, secondary steering motor drive unit 340 may be in communication with and/or receive commands from both controller 122 and secondary controller 322. Secondary steering motor drive unit 340 may be identical, or nearly identical, to steering motor drive unit 140 and may provide redundancy should steering motor drive unit 140 fail.

System 320 may further include a secondary main gear motor drive unit 350 operationally coupled to secondary controller 322. Secondary main gear motor drive unit 350 is configured to drive the main gear door motors 152 and the brake control motors 154 in response to commands from secondary controller 322. In various embodiments, secondary main gear motor drive unit 350 may be in communication with and/or receive commands from both controller 122 and secondary controller 322. Secondary main gear motor drive unit 350 may be identical, or nearly identical, to main gear motor drive unit 150 and may provide redundancy should main gear motor drive unit 150 fail.

In accordance with various embodiments, system 320 includes a secondary AC/DC converter 370 configured to provide power (e.g., DC current) to each of secondary motor drive units 330, 340, 350. Secondary AC/DC converter 370 may be electrically coupled to a secondary AC power supply 372. In various embodiments, secondary AC/DC converter 370 may be electrically coupled to both motor drive units 130, 140, 150 and secondary motor drive units 330, 340, 350. Secondary AC/DC converter 370 may be identical, or nearly identical, to AC/DC converter 200 and may provide redundancy should AC/DC converter 200 fail.

In accordance with various embodiments, system 320 may also include a secondary braking resistor 374 electrically coupled to secondary motor drive units 330, 340, 350. Secondary braking resistor 374 may dissipate the regeneration energy of the secondary motor drive units 330, 340, 350. In various embodiments, secondary braking resistor 374 may be electrically coupled to both motor drive units 130, 140, 150 and secondary motor drive units 330, 340, 350. Secondary braking resistor 374 may be identical, or nearly identical, to braking resistor 204 and may provide redundancy should braking resistor 204 fail.

Figure 6:
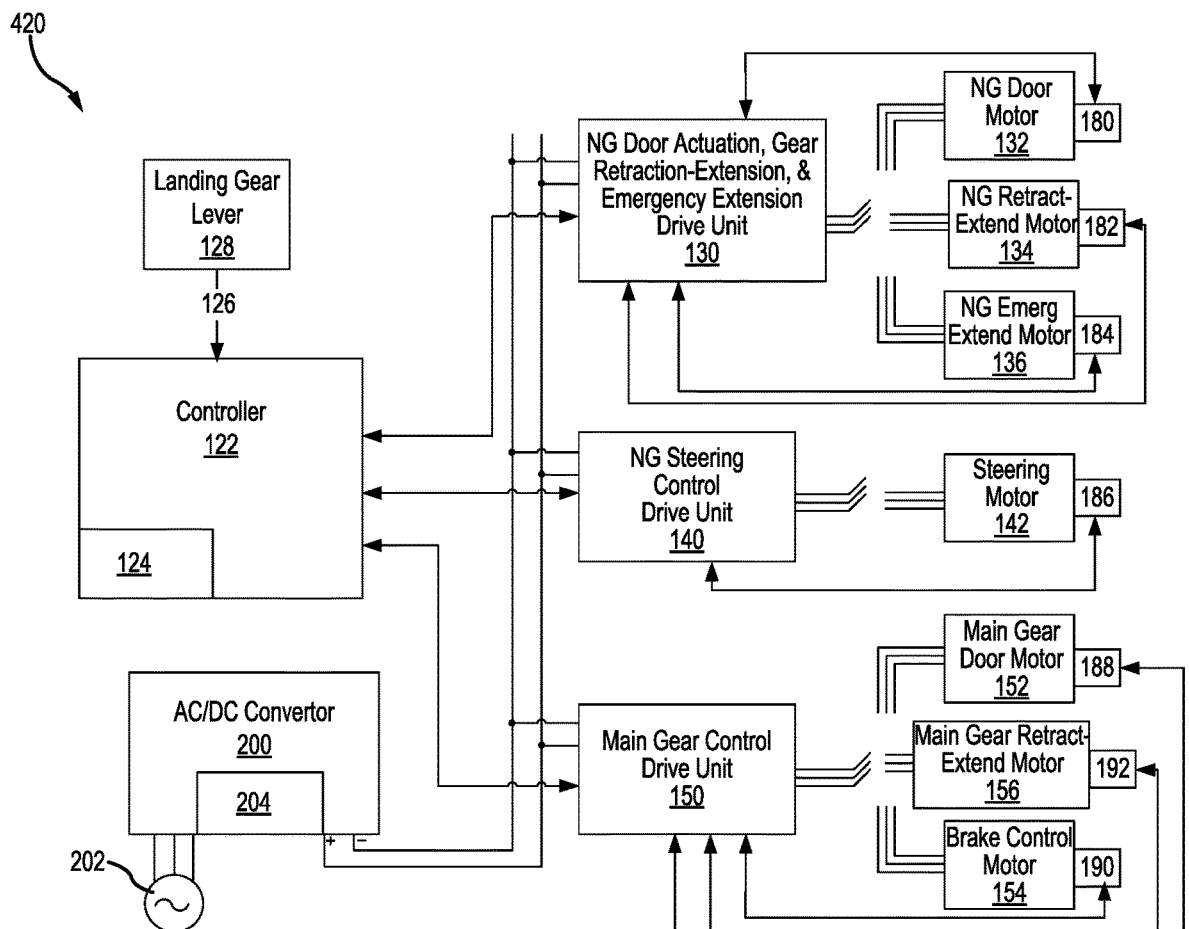
FIG. 6 illustrates a schematic of a system for controlling landing gear subsystems, in accordance with various embodiments.

In various embodiments, and with reference to FIG. 6, a system 420 for controlling landing gear subsystems is illustrated. System 420 may be similar to system 120 in FIGS. 3 and 4. Elements with like element numbering, as depicted in FIG. 3, are intended to be the same and will not necessarily be repeated for the sake of clarity.

In accordance with various embodiments, main gear motor drive unit 150 of system 420 may be configured to drive the main gear door motors 152, the brake control motors 154, and one or more main gear retraction-extension motor(s) 156. In various embodiments, main gear retraction-extension motors 156 may comprise electric motors (e.g., PMSMs, BLDC motors, or any other suitable electric motor). Main gear retraction-extension motors 156 may be configured to drive one or more hydraulic pumps that supply hydraulic pressure and fluid flow to hydraulic actuators configured to control retraction and extension of main landing gear 12, 14. Stated differently, retraction and extension of main landing gear 12, 14 may be controlled by electro hydrostatic actuators, and main gear motor drive unit 150 may provide power (i.e., current) to the electro hydrostatic actuators. In various embodiments, main landing gear 12, 14 may be translated between the landing gear up and landing gear down positions electrically (e.g., via EMAs). In this regard, main gear retraction-extension motors 156 may translate main landing gear 12, 14 between the landing gear down and landing gear up positions.

During operation of aircraft 10, main gear door motors 152, brake control motors 154, and main gear retraction-extension motors 156 may be operated at different times (i.e., not simultaneously). In accordance with various embodiments, a single main gear motor drive unit 150 may be employed to operate (i.e., drive) main gear door motors 152, brake control motors 154, and main gear retraction-extension motors 156. For example, if main gear motor drive unit 150 is driving main gear retraction-extension motors 156, main gear door motors 152 and brake control motors 154 may be dormant (i.e., powered off).

System 420 may include one or more main gear retraction sensors 192 may include one or more main gear retraction sensors 192 operationally coupled to main gear retraction-extension motors 156 and/or to components of main landing gear 12, 14 (e.g., to shock struts of left landing gear 12 and right landing gear 14). The output of main retraction sensors 192 may correlate to one or more operating conditions of main gear retraction-extension motors 156 (e.g., velocity, position, etc.). The output of main retraction sensors 192 may also provide information related to the position of main landing gear 12, 14 (e.g., extended, retracted, etc.). The output of main retraction sensors 192 may be received by main gear motor drive unit 150. The output of main retraction sensors 192 may be sent from main gear motor drive unit 150 to controller 122. Controller 122 may make decisions related to the operation of main gear retraction-extension motors 156 based on the signals output from main retraction sensors 192. Controller 122 may also make decisions related to the operation of main gear door motors 152 and/or brake control motors 154 based on the signals output from main gear retraction sensors 192. In various embodiments, main gear motor drive unit 150 may also drive one or emergency main gear extension motors and may make decisions related to the operation of the emergency main gear extension motors based on the signals output from main gear retraction sensors 192, similar to nose gear motor drive unit 130 and emergency nose gear extension motor 136. In various embodiments, controller 122 may output commands to main gear motor drive unit 150 configured to cause main gear motor drive unit 150 to power (or excite) main retraction sensors 192, when main gear retraction-extension motors 156 are in operation. In various embodiments, main retraction sensors 192 may also operate (i.e., receive power and provide output) when main gear retraction-extension motors 156 are turned off.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling landing gear subsystems, comprising:
   a controller;
   a nose gear motor drive unit in operable communication with the controller;

a first electric motor in operable communication with the nose gear motor drive unit, wherein the first electric motor is configured to actuate a nose landing gear bay door;
a second electric motor in operable communication with the nose gear motor drive unit, wherein the second electric motor is configured to actuate a nose landing gear between a landing gear up position and a landing gear down position,
wherein the nose gear motor drive unit is configured to drive one of the first electric motor or the second electric motor at a time;
a main gear motor drive unit in operable communication with the controller;
a third electric motor in operable communication with the main gear motor drive unit, wherein the third electric motor is configured to actuate a main landing gear bay door;
a fourth electric motor in operable communication with the main gear motor drive unit, wherein the fourth electric motor is configured to actuate a main landing gear brake assembly, wherein the main gear motor drive unit is configured to drive one of the third electric motor or the fourth electric motor at a time; and
a braking resistor electrically coupled to the nose gear motor drive unit and the main gear motor drive unit, the braking resistor being configured to dissipate regeneration energy from the nose gear motor drive unit and the main gear motor drive unit.

2. The system of claim 1, further comprising an alternating current direct current converter electrically coupled to the nose gear motor drive unit and the main gear motor drive unit.

3. The system of claim 2, further comprising:
a steering motor drive unit in operable communication with the controller and electrically coupled to the alternating current direct current converter and the braking resistor; and
a fifth motor in operable communication with the steering motor drive unit.

4. The system of claim 1, further comprising:
a first sensor operably coupled to at least one of the first electric motor or the second electric motor and in operable communication with the controller; and
a second sensor operably coupled to at least one of the third electric motor or the fourth electric motor and in operable communication with the controller.

5. The system of claim 4, wherein the controller is configured to output commands to the nose gear motor drive unit in response to signals output from the first sensor, and wherein the controller is configured to output a second set of commands to the main gear motor drive unit in response to signals output from the second sensor.

6. A landing gear system, comprising:
a nose gear door motor;
a nose gear motor drive unit in operable communication with the nose gear door motor;
a nose gear retraction-extension motor in operable communication with the nose gear motor drive unit;
an alternating current direct current converter electrically coupled to the nose gear motor drive unit;
a braking resistor electrically coupled to the nose gear motor drive unit and configured to dissipate regeneration energy from the nose gear motor drive unit;
a controller in operable communication with the nose gear motor drive unit; and
a tangible, non-transitory memory configured to communicate with the controller, the tangible, non-transitory memory having instructions stored thereon that, in response to execution by the controller, cause the controller to perform operations comprising:
receiving, by the controller, a pilot command;
determining, by the controller, a nose landing gear power sequence for providing power to the nose gear door motor and the nose gear retraction-extension motor in response to receiving the pilot command; and
outputting, by the controller, a first command to the nose gear motor drive unit, wherein the nose gear motor drive unit is configured to power either the nose gear door motor or the nose gear retraction-extension motor based on the first command from the controller.

7. The landing gear system of claim 6, wherein the nose gear motor drive unit includes a programmable logic device configured to receive commands, including the first command, from the controller, and wherein the programmable logic device generates pulse width modulation signals configured to control at least one of the nose gear door motor or the nose gear retraction-extension motor based on the commands received from the controller.

8. The landing gear system of claim 7, further comprising:
a first sensor operably coupled to the nose gear door motor and in communication with the controller; and
a second sensor operably coupled to the nose gear retraction-extension motor and in communication with the controller.

9. The landing gear system of claim 8, wherein the operations further comprise:
receiving, by the controller, a first signal from the sensor; and
determining, by the controller, whether to power the nose gear door motor or the nose gear retraction-extension motor based on the first signal.

10. The landing gear system of claim 9, further comprising:
a main gear motor drive unit electrically coupled to the alternating current direct current converter and the braking resistor and in operable communication with the controller, the braking resistor being configured to dissipate regeneration energy from the main gear motor drive unit;
a main gear door motor in operable communication with the main gear motor drive unit; and
a brake control motor in operable communication with the main gear motor drive unit.

11. The landing gear system of claim 10, wherein the operations further comprise:
determining, by the controller, a main landing gear power sequence for powering the main gear door motor and the brake control motor in response to receiving the pilot command; and
outputting, by the controller, a second command to the main gear motor drive unit, wherein the main gear motor drive unit is configured to power either the main gear door motor or the brake control motor based on the second command from the controller.

12. A system for controlling landing gear subsystems, comprising:
a controller;
a first motor drive unit in operable communication with the controller, wherein the first electric motor is configured to actuate a nose landing gear bay door;

a first electric motor in operable communication with the first motor drive unit;

a second electric motor in operable communication with the first motor drive unit, wherein the second electric motor is configured to actuate a nose landing gear between a landing gear up position and a landing gear down position;

a second motor drive unit in operable communication with the controller;

a third electric motor in operable communication with the second motor drive unit, wherein the third electric motor is configured to actuate a main landing gear bay door;

a fourth electric motor in operable communication with the second motor drive unit, wherein the fourth electric motor is configured to actuate a main landing gear brake assembly;

an alternating current direct current converter electrically coupled to the first motor drive unit and the second motor drive unit; and a braking resistor electrically coupled to the first motor drive unit and the second motor drive unit, the braking resistor being configured to dissipate regeneration energy from the first motor drive unit and the second motor drive unit.

13. The system of claim 12, wherein the first motor drive unit includes a first programmable logic device configured to receive a first command from the controller and generate first pulse width modulation signals configured to control at least one of the first electric motor or the second electric motor in response to the first command from the controller, and wherein the second motor drive unit includes a second programmable logic device configured to receive a second command from the controller and generate second pulse width modulation signals configured to control at least one of the third electric motor or the fourth electric motor in response to the second command from the controller.

14. The system of claim 12, further comprising:
a first sensor operably coupled to the first electric motor and in communication with the controller;
a second sensor operably coupled to the second electric motor and in communication with the controller;
a third sensor operably coupled to the third electric motor and in communication with the controller; and
a fourth sensor operably coupled to the fourth electric motor and in communication with the controller.

15. The system of claim 12, wherein the first motor drive unit is configured to drive the first electric motor non-simultaneously with the second electric motor, and wherein the second motor drive unit is configured to drive the third electric motor non-simultaneously with the fourth electric motor.

* * * * *